United States Patent [19]

Gresch

[11] Patent Number: 5,496,577
[45] Date of Patent: Mar. 5, 1996

[54] PROCESS FOR THE PRODUCTION OF A LOW-SUGAR, ALCOHOL-FREE BEVERAGE

[75] Inventor: Walter Gresch, deceased, late of Niederweningen, Switzerland, by Susan Gresch and Beatrice Gresch, administratratrix

[73] Assignee: Bucher-Guyer AG, Maschinenfabrik, Niederweningen, Switzerland

[21] Appl. No.: 122,484

[22] PCT Filed: Jan. 19, 1992

[86] PCT No.: PCT/CH93/00007

§ 371 Date: Jun. 1, 1994

§ 102(e) Date: Jun. 1, 1994

[87] PCT Pub. No.: WO93/14650

PCT Pub. Date: Aug. 5, 1993

[30] Foreign Application Priority Data

Jan. 29, 1992 [CH] Switzerland ............... 0246/92-9

[51] Int. Cl.⁶ ............... A23L 2/00; A23L 2/08; A23L 2/70; A23L 2/74
[52] U.S. Cl. ............... 426/330.5; 426/490; 426/599; 426/616
[58] Field of Search ............... 426/15, 330.5, 426/490, 599, 616

[56] References Cited

U.S. PATENT DOCUMENTS

| | | | |
|---|---|---|---|
| 4,902,518 | 2/1990 | Lang et al. | 426/14 |
| 5,254,174 | 10/1993 | Hansen et al. | 127/53 |
| 5,403,604 | 4/1995 | Black, Jr. et al. | 426/330.5 |

FOREIGN PATENT DOCUMENTS 9203066  3/1992  WIPO .

*Primary Examiner*—Donald E. Czaja
*Assistant Examiner*—Curtis E. Sherrer
*Attorney, Agent, or Firm*—Edmund M. Jaskiewicz

[57] ABSTRACT

A process for the production of a low-sugar, alcohol-free beverage comprises a desugarization process, which is upstream to a preliminary separation. Through the preliminary separation, the raw juice is divided into two streams (A,B), of which the first stream, relative to the raw juice, has a lower acid/sugar ratio and a higher sugar content and the second stream has an elevated acid/sugar ratio and a lower sugar content. The first stream is directly fed to the desugarization process, while the second stream is fed to the low-sugar juice after the desugarization process. The second stream contains a high portion of acid and other, low-molecular components and thus when mixed with the first stream, increases the total content and the quality of the end product.

12 Claims, 2 Drawing Sheets

5,496,577

PROCESS FOR THE PRODUCTION OF A LOW-SUGAR, ALCOHOL-FREE BEVERAGE

FIELD OF THE INVENTION

The present invention relates to a process for the production of a low-sugar, alcohol-free beverage, especially fruit juice from sweet juices of plant products, especially fruits, grapes, berries and other produce, more particularly, to such a process in which the raw juice is fed to a desugarization process.

A physical process for desugarizing beverages is known by WO 89/10703, in which the sugar is removed from the raw juice in a membrane separating unit by suitable selection of the membrane. The substances remaining in the retentate or in the permeate after the removal of the sugar are again recycled in the process or in the end product.

With this process, a high selectivity and also an improvement in quality are already achieved. But partially the RSK values for standard juices are still not quite reached especially for the low-molecular components such as acids, minerals, etc. The consequence of this is a reduced taste experience and a lower rating in the context of the legal allowability of the beverage which finally results in a decrease in value.

Further, nonphysical desugarization processes have become known (e.g., CH-PS 632 137 and EP-OS 0382010), in which the sugar contained in the initial liquid is partially or completely broken down by the effect of enzymes or microorganisms. In these known, fermentative or microbiological desugarization processes, untypical by-products develop in the beverage from secondary reactions, which distort the original nature of the beverage. It is therefore desirable to prevent this effect. Moreover, these known processes are also relatively expensive, since biological or fermentative processes operate with relatively small space-time yields, which requires relatively large equipment.

SUMMARY OF THE INVENTION

The object of the invention is therefore to provide a process of the above-mentioned type, with which a further improvement of the product quality with relatively low production costs is achieved.

According to the invention, this object is achieved in that the raw juice is divided before the desugarization process by a preliminary separation into two streams, of which one stream, relative to the raw juice, has a lower acid/sugar ratio and a second stream having a higher acid/sugar ratio and a lower sugar content, and in that the first stream is fed to the desugarization process and the second stream to the low-sugar juice after the desugarization.

Other embodiments and features of the invention can be found in the claims.

The invention is explained in more detail in the following description and the drawing, which represents several embodiments. There are shown in

DESCRIPTION OF THE PREFERRED EMBODIMENTS

Figure 1:
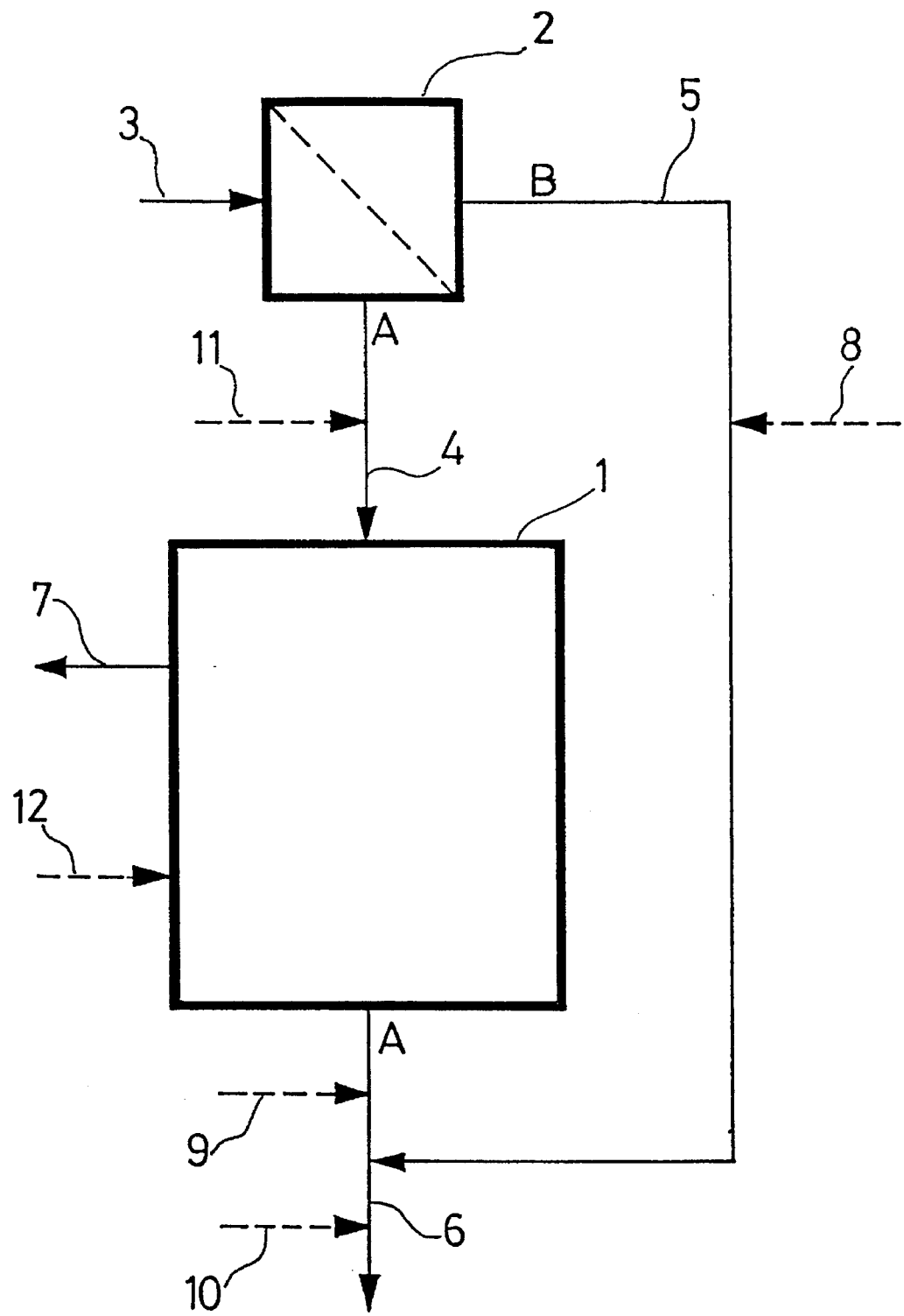
FIG. 1 shows a diagrammatic representation of a desugarization process with upstream preliminary separation.

The process represented diagrammatically and without internal cycles in FIG. 1 consists of any known desugarization process 1 upstream to a preliminary separation 2. The sweet raw juice extracted by a supply line 3 from plant products such as fruits, grapes, berries and other produce is introduced into preliminary separation 2. As a process for preliminary separation 2, i.e., certain membrane processes, in particular nanofiltration, dialysis, as well as sorption processes, are suitable. Especially suitable is a nanofiltration process, which operates with a membrane of 5 to 20% NaCl retention, measured at 3500 ppm of NaCl, 40 bars and 25 degrees C.

In preliminary separation 2, the raw juice is divided into two streams, of which retentate-side stream A is fed by a line 4 directly to desugarization process 1. Relative to the initial raw juice, stream A has a lower acid/sugar ratio and a higher sugar content. Permeate-side stream B, which exhibits an elevated acid/sugar ratio and a lower sugar content relative to the raw juice is brought out by a line 5 from preliminary separation 2 and again recycled in stream A after desugarization process 1. Stream A combined with stream B is removed by a line 6 either as a concentrated, low-sugar juice that is later diluted to drinking strength, or as a low-sugar juice diluted with water to drinking strength in the course of the process. By a line 7, the remaining sugar-containing juice leaves desugarization process 1 as a syrup.

The raw juice is introduced, preferably in concentrated form, into preliminary separation 2. A juice concentrated relative to standard drinking strength is advantageously used so that the desired properties relative to acid/sugar ratio and sugar content can develop. As concentrated raw juice, a clouded or clear juice is understood, whose sugar concentration, e.g., is at least 10% above the standard drinking strength. This standard is e.g. 11.8° Brix in the case of apple juice, thus the raw juice is at least 12.98° Brix, preferably equal to or greater than about +30°. In the embodiment, the raw juice concentration is about 20° Brix and about 9.5 g/l of acid.

Because of the differences in the acid/sugar ratio between streams A and B, low-molecular components, e.g., besides acids also minerals, are automatically enriched in stream B relative to the sugar content. Because of this, it is possible, depending on the selection of the process, for preliminary separation 2 to separate from the raw juice concentrate a stream B, which, after dilution by water to the sugar content of stream A or of the low-sugar juice, contains the low-molecular portions except for sugar within the RSK values. RSK values refer to standard values and ranges of reference numbers (Richwerte und Schwankungsbreiten von Kennzahlen". These values are well known in the art. As a result, the end product, i.e., the low-sugar juice, is improved qualitatively with the increasing quantitative ratio of stream B to stream A with respect to the content of low-molecular portions (without sugar), which solves the quality problem, e.g., in the above-mentioned, known physical desugarization process. But also in the known, nonphysical processes, the problem of the influence on taste by by-products with increase of the quantitative ratio of stream B to stream A is alleviated by the preliminary separation according to the invention.

In the embodiment according to. FIG. 1, a nanofiltration process with a membrane of about 10% NaCl retention is used for preliminary separation 2. Permeate-side stream B leaves preliminary separation 2 by line 5 with about 50 parts of volume for each 100 parts of volume of raw juice supplied at line 3, about 15° Bx and 11 g/l of acid. Starting from a raw juice with about 20° Brix and about 9.5 g/l of acid content, a permeate stream is achieved, which, after redilution with water from 15° Bx to the low-sugar drinking strength of about 7.5° Brix, exhibits the same acid content as the raw juice rediluted to standard drinking strength of about 11.5° Brix. The mineral substances and other low-molecular portions also behave analogously., Since here the portion of stream B starting from the preliminary separation is relatively high (about 50 parts of volume for each 100 parts of volume of raw juice supplied at line 3), important advantages are achieved for the product quality. On the one hand, about half the initial juice exhibits approximately the full content of acids and also other, low-molecular components and therefore, mixed with stream A, can increase the total content of the end product. As a result, an improvement in quality is achieved, in which the average values formed by the mixing lie within the RSK values, although, e.g., the content of these components in stream A lies below the RSK value. On the other hand, by the enrichment of the named low-molecular portions in stream B, their concentration in stream A, which passes through desugarization process 1, drops. Because of this, less is lost during the desugarization, especially with use of membrane processes for desugarization. This effect thus provides a further improvement of the end product.

In the embodiment according to FIG. 1, the water necessary for diluting stream B is introduced with about 25 parts of volume for each 100 parts of volume of raw juice supplied at line 3 into line 5 by a line 8 and thus fed to stream B. Stream B, diluted in this way, then passes with about 75 parts of volume for each 100 parts of volume of raw juice supplied at line 3, a sugar concentration of about 7.5° Brix, and an acid content of about 5.5 g/l into line 6 or into stream A and is mixed there with the low-sugar juice that has left desugarization process 1 after desugarization has been completed. Water can be fed to the low-sugar juice before and after the introduction of stream B into stream A by lines 9 and 10.

Retentate-side stream A leaves preliminary separation 2 by line 4 with about 50 parts of volume for each 100 parts of volume of raw juice supplied at line 3 and about 25° Brix. About 45 parts of water for each 100 parts of volume of raw juice supplied at line 3 are fed by line 11, so that diluted stream A, on beginning the desugarization process, exhibits about 95 parts of volume for each 100 parts of volume of raw juice supplied at line 3 with a sugar concentration of about 13° Brix.

Desugarization process 1 can consist of known, simple processes, such as, e.g., single-stage nano, reverse osmosis, dialysis, adsorption, fermentation processes, etc., or of multistage processes. During desugarization, water can be fed by a line 12 to desugarization process 1. The operation of the overall process can be performed batchwise or continuously.

Analogously to the quality improvement, achieved with the process according to the invention, the costs are also reduced, since the costs for preliminary separation 2 are relatively low and only a partial amount has to pass through relatively expensive desugarization process 1. Since about 50% of the total volume goes into stream B, desugarization process 1 is to be designed for only just about half the total capacity. If it is further considered that the flux values of the nanofiltration are relatively high because of the relatively low NaCl retention of the membrane, then quite considerable cost savings result in comparison to direct desugarization or to known desugarization processes without the preliminary separation according to the invention. Thus, despite a qualitative improvement of the end product, overall lower production costs result.

Because of the use of raw juice with elevated concentration, advantageous results can be achieved also with preliminary separation processes in which substance transport takes place by diffusion. If a dialysis or sorption process is used for preliminary separation 2, at least the water provided for the dilution of stream B is preferably used as rinsing water for stream B (dyalisate side in dialysis).

If it is important that the low-sugar juice be free of by-products, then preferably, for desugarization process 1, a process according to WO-89/10703 is used, in which the loss of higher-molecular components is very low. The reverse is true for low-molecular substances in the preliminary separation, particularly if a nanofiltration process is used for preliminary separation 2. The positive effects of both processes are complemented synergistically, so that thus very high-quality, low-sugar juices can be produced.

If raw juice concentrate is used as initial liquid, the juice is to be diluted during the course of the process or else later as a rule with drinking water about as far as is necessary for the production of beverages with sugar content corresponding to drinking strength, minus sugar removed by the desugarization process. As represented and described in the embodiment according to FIG. 1, the feeding of dilution water at any point after preliminary separation 2 is possible in principle. But for qualitative reasons it is advantageous, depending on the desugarization process, if the initial concentration for desugarization process 1 is not too high. Therefore, at least part of the dilution water can be added with about 45 parts by line 11 into stream A before beginning desugarization process 1.

Only so much water is added to stream B such that the sugar content after dilution corresponds to the sugar content of the low-sugar juice. In the embodiment, about 25 parts of water for each 100 parts of volume of raw juice supplied at line 3 are added to stream B by line 8. But this amount of water can also be fed, in addition to the other dilution water, to stream A before, during or after desugarization process 1.

By combining the preliminary separation and recycling system according to the invention with relatively simple but economical desugarization processes, economical overall processes that are suitable for inexpensive production of low-sugar juices can also be achieved. These low-sugar juices are qualitatively still greatly superior to the usual light fruit juice beverages that are produced by diluting fruit juices with water. In the embodiment according to FIG. 2, such a system is represented, consisting of a combination of preliminary separation 2 with a simple dialysis process 13. The retentate side of preliminary separation 2, which is formed by a nanofiltration 14, is connected by a line 15 to dialysis process 13. The desugarization of the retentate stream (stream A), which is introduced by line 15 into dialysis process 13, takes place with a flushing on the dialysis side, represented by two stream arrows 13A and 13B going to and from stage 13, of dialysis process 13. Here, the separating border of the dialysis membrane preferably is selected smaller than in the usual industrial equipment, e.g., under 5000 D, to retain higher-molecular portions better. Also, it is advantageous to plug the membrane, e.g., ionically, so that the passage of acid is impeded.

Permeate-side stream B of nanofiltration 14 (stage I) is again recycled, by line 5 as in the embodiment according to FIG. 1, and after desugarization or after dialysis process 13 (stage II), in stream A, which is removed as low-sugar juice by line 6. The addition of dilution water into stream A or B can be performed as in the embodiment according to FIG. 1 by lines 11 or 8.

Figure 2:
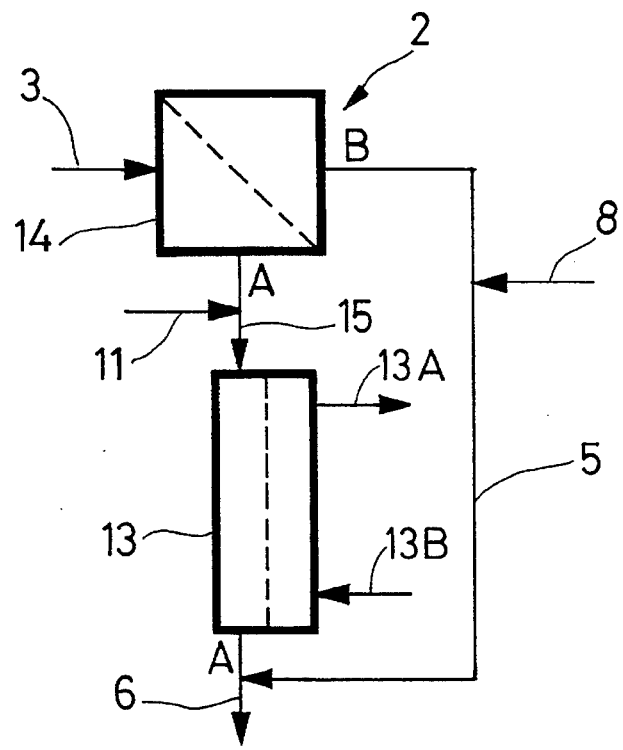
FIG. 2 shows the preliminary separation according to FIG. 1 combined with a dialysis process for the desugarization and FIG. 3 shows the preliminary separation according to FIG. 1 combined with a nanofiltration process for the desugarization.
Figure 3:
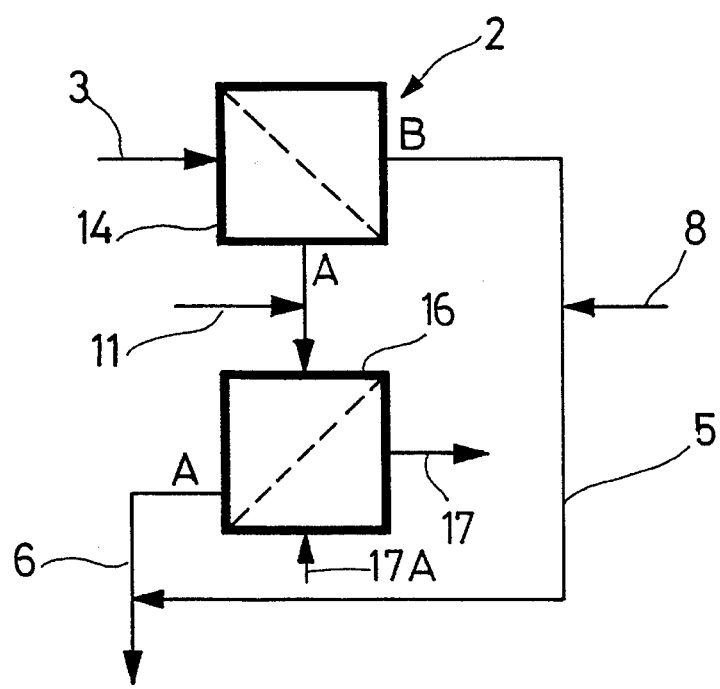

Another embodiment of the invention is represented in FIG. 3. A low-cost overall process is also involved, in which preliminary separation 2, which consists of a nanofiltration 14 as in the embodiment according to FIGS. 1 and 2, is combined with another nanofiltration 16 as a desugarization process. Nanofiltration 16 exhibits, in comparison with preliminary separation 2, a smaller separating border, e.g.., 30–60% salt retention at 3500 ppm of NaCl, 40 bars, 25° C. To replace the water, which comes out with the permeate, again in the fruit juice, second nanofiltration 16 is suitably performed in the diafiltration operation with flushing on the dialysate side represented by a stream arrow 17A going into stage 16 and an arrow 17 going out of it. Because of this, the content of other substances (except sugar) in the permeate can be reduced.

To dilute stream A, dilution and diafiltration water is fed to it by line 11. Dilution water can be fed to stream B by line 8 in the same way as in the embodiments according to FIG. 1 and 2. The sugar-containing permeate of nanofiltration 16 (stage II) is removed by a line 17, while stream A leaves nanofiltration 16 as retentate and, after recycling stream B by line 5 into stream A, is removed as low-sugar juice by line 6.

In both cases (embodiment according to FIGS. 1 and 2), it is generally useful, if only before stage II (dialysis process 13, nanofiltration 16), to add dilution water to stream A to reduce losses of useful substances, except for sugar, in stage II. But if quality must come second to costs, it will then be better to go with as high a concentration of sugar as possible in stage II to improve the specific output of this stage. In this case, the addition of water would be performed only after stage II.

In another embodiment of the invention, the process according to the invention can also advantageously be used for the production of low-alcohol, fermented beverages. In this connection, sweet juices made of plant products, in particular fruits, grapes, berries and other produce, are also used as initial products. The now usual method for production of such beverages is the alcoholic fermentation of sweet juices into wine and the removal of alcohol from the wine by physical processes, in particular thermal processes and membrane processes.

The problem in the known processes consists in that, because of the relatively slightly volatile alcohol, when it is removed, also more or less slightly volatile, other substances important for flavor formation are also removed by so-called "entrainment," which results in adversely affecting the flavor.

To solve this problem, it is in principle generally possible first to desugarize the raw substance, respectively to reduce its sugar content in particular with physical methods, and then to ferment this low-sugar juice alcoholically. In this way, it is possible, e.g., starting from grape juice, which in the usual way results in a wine with 10% alcohol, to produce a light wine of high flavor quality with 5–6% alcohol by a standard, full fermentation. Later, it is always still possible to dealcoholize this new initial product to 2 and fewer % alcohol as usual. The loss of flavoring substances is then lower than in dealcoholization starting from 10% alcohol.

For such a production process, the overall process according to the invention, within the known processes, is especially well suited for desugarization. The reason is that, because of the preliminary separation according to the invention following the desugarization, an intermediate product that is especially rich in low-molecular portions, among them flavoring substances, is produced before fermentation. Here, it is important to operate the overall process cold, i.e. at less than about 25° C. to avoid temperature damages.

Since, when using the process according to the invention, the loss of flavoring substances is relatively low, the usual thermal deflavoring before the overall process and the subsequent feeding of the removed flavoring substances cart be dispensed with advantageously for the flavor quality, which suffers from thermal deflavoring.

As initial material, both concentrate and single-strength juice are suitable. The concentrate is preferably provided cold, e.g., via concentrating by reverse osmosis without previous separation.

Instead of the combination of a desugarization-overall process with a subsequent dealcoholization process, which is used to achieve low alcohol content of, e.g., less than 2% vol., the combination of the overall desugarization process according to the invention with a fermentation process is useful, which can develop an amount of alcohol reduced relative to the standard fermentation process. For this purpose, known fermentation processes, e.g., according to DE-OS 4 003 404, are suitable. As a result, the following advantages are achieved:

A qualitative improvement is achieved since the progress starts from a raw substance with low sugar content, but, moreover, with a qualitatively high-grade juice as raw material for the fermentation. Further, a considerable saving in the fermentation time is achieved. Analogously to the production of beer, continuous processes can thus be achieved by immobilized yeasts in bioreactors, which leads to the drastic reduction of production costs of such beverages. This principle can also be applied for a full fermentation because of the low sugar content in the raw substance before the fermenting, e.g., by combining the process according to the invention with beverage fermentation according to WO 89/07132.

It will be understood that this invention is susceptible to modification in order to adapt it to different usages and conditions, and accordingly, it is desired to comprehend such modifications within this invention as may fall within the scope of the appended claims.

We claim:

1. A process for the production of a low-sugar, alcohol-free fruit juice beverage from raw juices of fruits, grapes, berries and other fruits comprising the steps of subjecting an initial product consisting of a raw juice to a preliminary separation to divide the raw juice into a first stream having a lower acid/sugar ratio and a higher sugar content relative to the raw juice and a second stream having a higher acid/sugar ratio and a lower sugar content relative to the raw juice, subjecting the first stream to a desugarization process, and introducing the second stream with its high quantitative ratio of acids to sugar into the first stream after the desugarization thereof to increase the content of acid therein whereby the quality of the first stream is increased.

2. A process as claimed in claim 1 and the step of supplying dilution water to the second stream to lower the sugar content thereof to substantially the sugar content of the first stream after passing through desugarization.

3. A process as claimed in claim 1 and the step of supplying dilution water to the first stream to lower the sugar content thereof, wherein a portion of the dilution water is introduced into the first stream before entering the desugarization process.

4. A process as claimed in claim 1 wherein the initial product is a concentrated raw juice having a concentration equal to or greater than about 20 degrees Brix.

5. A process as claimed in claim 1 wherein the preliminary separation comprises a membrane process.

6. A process as claimed in claim 5 wherein the membrane process comprises one of nanofiltration, dialysis or sorption.

7. A process as claimed in claim 6 wherein the nanofiltration process comprises a membrane of 5 to 20 percent NaCl retention measured at 3500 ppm of NaCl at 40 bars and 25 degrees C.

8. A process as claimed in claim 2 wherein with one of the dialysis and sorption processes at least the water provided for the dilution of the second stream is used as rinsing water for the dialysate side during dialysis.

9. A process as claimed in claim 1 wherein the desugarization process comprises membrane separation.

10. A process as claimed in claim 1 wherein the preliminary separation including the introducing of the second stream into the first stream is combined with a simple dialysis process with flushing on the dialystate side for desugarizing a retentate stream resulting from the dialysis.

11. A process as claimed in claim 1 wherein the preliminary separation comprises a nanofiltration which is combined with a second nanofiltration for the desugarization, said second nanofiltration in comparison to said first nanofiltration has a smaller separating border of substantially 30–60% salt retention at 3500 ppm of NaCl 40 bars at 25 degrees C.

12. A process as claimed in claim 1 wherein the process is performed at a temperature less than about 25 degrees C.

* * * * *